Oct. 6, 1936.　　　J. S. PECKER　　　2,056,891
CENTRIFUGAL SEPARATING MACHINE
Filed Nov. 19, 1934　　　6 Sheets—Sheet 1

INVENTOR
ATTORNEY

Oct. 6, 1936.　　　J. S. PECKER　　　2,056,891
CENTRIFUGAL SEPARATING MACHINE
Filed Nov. 19, 1934　　　6 Sheets-Sheet 2

Oct. 6, 1936.  J. S. PECKER  2,056,891
CENTRIFUGAL SEPARATING MACHINE
Filed Nov. 19, 1934  6 Sheets-Sheet 4

INVENTOR
ATTORNEY

Oct. 6, 1936.  J. S. PECKER  2,056,891
CENTRIFUGAL SEPARATING MACHINE
Filed Nov. 19, 1934  6 Sheets-Sheet 5
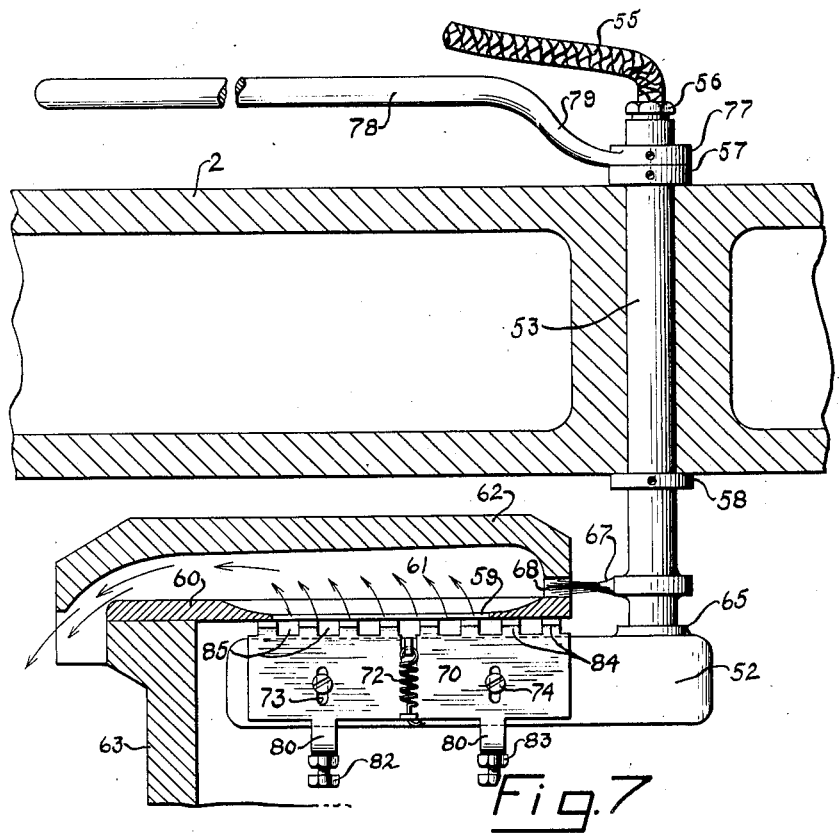
Fig. 7
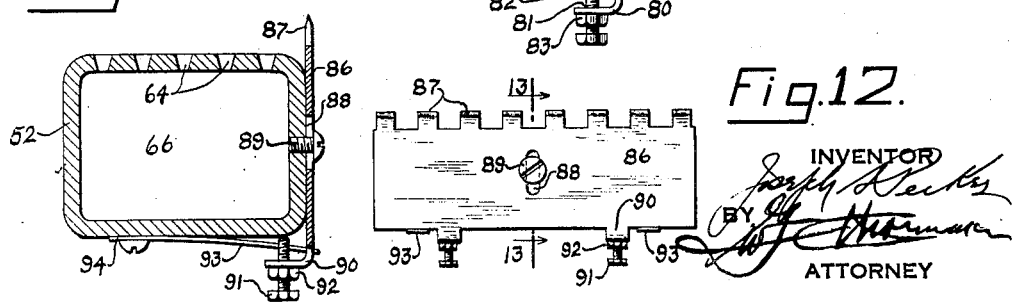
Fig. 8.
Fig. 13.
Fig. 12.

Oct. 6, 1936.   J. S. PECKER   2,056,891
CENTRIFUGAL SEPARATING MACHINE
Filed Nov. 19, 1934   6 Sheets-Sheet 6

INVENTOR
BY
ATTORNEY

Patented Oct. 6, 1936

2,056,891

UNITED STATES PATENT OFFICE 2,056,891

CENTRIFUGAL SEPARATING MACHINE

Joseph S. Pecker, Philadelphia, Pa., assignor to American Centrifugal Corporation, New York, N. Y., a corporation of Delaware Application November 19, 1934, Serial No. 753,736

58 Claims. (Cl. 210—63)

The invention relates to centrifugal separating machines.

The object of the present invention is to improve the construction of the seepage means of centrifugal separating machines of the type shown, described and claimed in an application filed by me February 21, 1934, Serial No. 712,390 and equipped with seepage means operating at right angles to the centrifugal force for permitting seepage of liquid from the top of the rotary centrifugal basket, and to increase the capacity of the centrifugal separating machine by producing a more rapid flow and discharge of the effluent without impairing the effectiveness of the means for straining the effluent from the solids.

A further object of the invention is to provide a vacuum seepage structure adapted to operate as a fan or blower and produce currents of air of high velocity traveling outwardly in a general radial direction from the central portion of the top of the basket to the periphery of the same and passing over the effluent straining or seepage means and creating a suction or vacuum thereat coacting with and assisting the centrifugal forces in the drainage of water from the sludge and also in carrying the strained effluent from the straining or seepage means to the point of discharge at the periphery of the basket.

It is also an object of the present invention to provide a novel seepage means provided with channels and arrange the channels so as to become a component of the tangential and radial forces tending to discharge the liquid and thereby minimize the friction in the channels and reduce the power required for the operation of the machine.

Another object of the invention is to provide a seepage means for rotary centrifugal baskets having channels including a seepage plate having comparatively large areas of relatively long slots provided with narrow lower entrance portions to exclude solid matter and wide upper outlet portions adapted to permit ready discharge of the water into the channels and an unobstructed distribution of the water throughout the channels.

A further object of the invention is to provide simple and efficient means for cleaning the seepage plate and the channels adapted to shoot a fluid medium under high pressure upwardly through the slots in the seepage plate to cleanse the slots and carry into the channels any particles dislodged from and forced through the slots so that the fluid medium and such dislodged particles will be forced through the channels.

Another object of the invention is to equip the cleaning means with a scraper knife adapted to scrape the solid material from the entrance portions of the slots and cut and shred material wedged in the slots prior to shooting the fluid medium through the slots whereby a maximum effect of the fluid medium in cleaning the slots will be obtained.

With these and other objects in view, the invention consists in the construction and novel combination and arrangement of parts hereinafter fully described, illustrated in the accompanying drawings and pointed out in the claims hereto appended, it being understood that various changes in the form, proportion and minor details of construction, within the scope of the claims, may be resorted to without departing from the spirit or sacrificing any of the advantages of the invention.

In the drawings:—

Fig. 7 is an enlarged detail vertical sectional view on the line 7—7 of Fig. 6.

Fig. 8 is a detail sectional view taken substantially on the line 8—8 of Fig. 6.

Fig. 12 is a side elevation of the horizontally swinging cleaning device provided with a slidable and pivotal scraper knife illustrating another form of the invention.

Fig. 13 is a transverse sectional view of the same taken substantially on the line 13—13 of Fig. 12.

Figure 1:
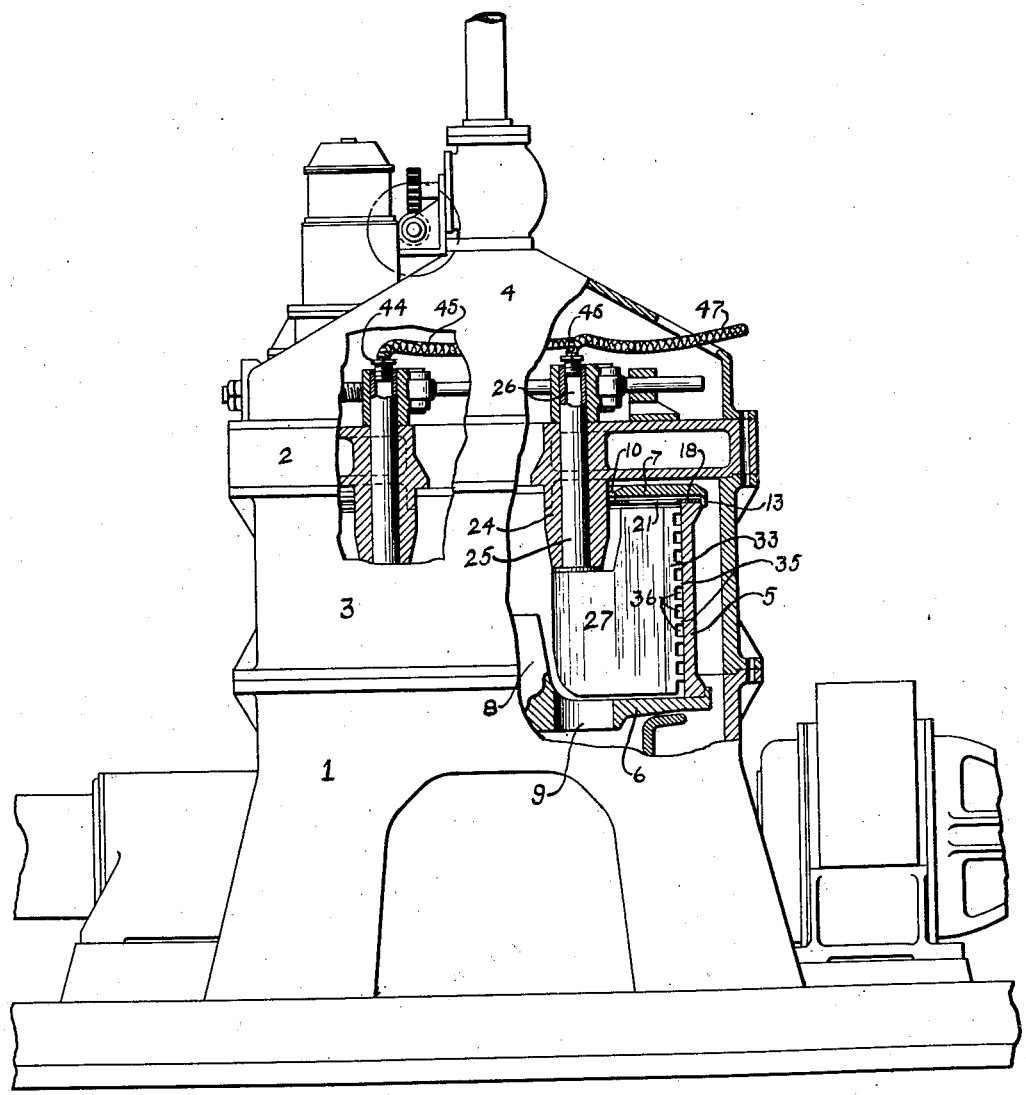
Figure 1 is an elevation partly in section of a centrifugal separating machine provided with a seepage structure and having one form of cleaning means constructed in accordance with this invention.

In the accompanying drawings the improvements of the present invention are shown applied to a centrifugal separating machine constructed substantially as shown and described in the aforesaid application and comprising a casing composed of a lower section 1, upper and lower intermediate sections 2 and 3 and a top section 4 detachably bolted or otherwise secured together as explained in the said application. The centrifugal basket 5 consists of a cylindrical body portion, a circular bottom plate 6 and a circular top plate 7, the top and bottom plates being bolted to the cylindrical body portion at the upper and lower edges thereof. The cylindrical body portion of the basket 5 forms imperforate vertical walls or sides and the bottom plate of the basket which has a horizontal upper face is provided with a central hub 8 and has a plurality of radial openings 9 surrounding the hub for the discharge of the sludge.

Figure 4:
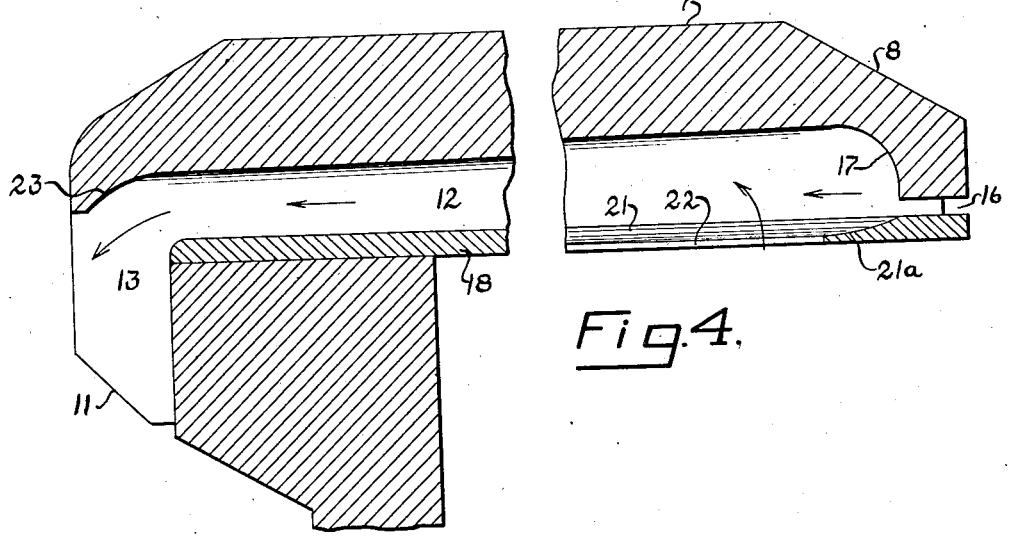
Fig. 4 is a similar view taken on the line 4—4 of Fig. 2.

The top plate 7 of the rotary centrifugal basket is of annular form and has a central opening 10 and is provided at its lower face with a recess formed by a depending peripheral flange 11. The top plate has an annular series of grooves 12 extending across the lower face of the same from the inner periphery to the outer periphery thereof and arranged at an angle to the radii of the annular top plate. The grooves form channels and each channel is arranged at an obtuse angle to the tangent at its outer end to facilitate a tangential discharge of the liquid from the outer end 13 of the channel which is flared to facilitate the ready discharge of the liquid. The angularity of the grooves constitutes a component of the tangential and radial forces tending to discharge the liquid and thereby minimizes the friction in the channels and the consumption of power necessary to operate the machine. The channels 12 are arched transversely and the side walls 14 and the top wall 15 are transversely concave. The inner end of the channel has a reduced opening 16 forming an air inlet and the inner end wall 17 above the reduced air inlet 16 is concave, as clearly shown in Fig. 4 of the drawings. The outlet formed by the flared outer end of the channel is relatively large.

The bottom wall of the channels is formed by an annular seepage plate 18 fitting snugly within the recess formed by the peripheral flange 11 and having its outer portion arranged upon the upper edge of the cylindrical body portion of the basket 5 and secured to the same by the bolts 19 which fasten the top plate of the basket to the cylindrical body portion thereof. The seepage plate 18 is also secured to the top plate by screws 20 to enable the top plate and the seepage plate to be handled as a unit when the top plate is removed from the body portion of the rotary centrifugal basket. The bolts 19 for securing the top plate to the cylindrical body portion of the centrifugal basket are arranged at spaced points in an annular series around the top of the basket at the periphery thereof and they are threaded into the cylindrical body portion of the basket at the upper edge of the same. The seepage plate 18, which is preferably constructed of brass but which may be made of any other suitable material, is secured at its periphery between the top plate and the upper edges of the walls of the cylindrical body portion of the basket by means of the said bolts or screws 19 which pierce both the top plate and the seepage plate. The solid metal of the cylindrical body portion in which the screws or bolts 19 are tapped not only supports the brass seepage plate from buckling under the water pressure but it also helps to stiffen the entire top plate. The arrangement of the channels between the spaced bolts 19 by which the top plate is secured to the body portion of the basket permits the maximum channel area obtainable in a basket construction of this character. The seepage plate is provided at the channels 12 with groups of slots 21 extending longitudinally of the channels and located at the bottom thereof and having narrow inlets 22 at the lower face of the seepage plate and relatively large outlets at the upper face of the seepage plate formed by flaring the slots 21 transversely, as clearly illustrated in the drawings.

The narrow lower inlet portions of the slots 21 tend to prevent solid material from passing through the slots into the channels and the upwardly flaring of the slots and the relatively large outlets formed by the tapering of the slots permit ready discharge of the water and a free unobstructed distribution of the same throughout the channels. This structure forms an efficient straining means of relatively large area and greatly increases the capacity of the centrifugal separating machine. A maximum vacuum or suction effect is facilitated by providing concave surfaces 21ª located at the inner and outer ends of the seepage slots and extending from the inlet portions of the slots to the upper face of the seepage plate.

The water or other liquid removed from the material through the centrifugal action of the rotary basket flows upwardly through the slots 21 and enters the channels 12 and is carried outwardly through the annular series of channels 12 and is discharged in an outward and downward direction at the periphery of the rotary basket, the liquid being directed downwardly by a downwardly curved deflecting end portion 23 of the top wall 15 of each channel. The rotary movement of the top plate produces a strong fan or blower action which results in currents of air passing through the channels 12 at a high velocity from the inner ends of the channels to the outer ends thereof. This produces a suction or vacuum over the groups of slots 21 and assists the centrifugal action in causing the separated liquid to pass through the straining or seepage slots 21 in the seepage plate. Also the currents of air cooperate with the centrifugal force in causing the water to flow outwardly through the channels and to discharge at the periphery of the rotary centrifugal basket. Owing to the particular form of the channels which have reduced inlets at their inner ends and large outlets at their outer ends the high speed of rotation of the basket tends to draw air in the channels at the inner ends thereof and also to create a vacuum at the slots of the seepage plate and thereby assists both the drainage of water from the sludge and the distribution of the water within the channels.

The intermediate section or supporting member 2 of the casing of the machine is provided at opposite sides of the center with vertical hubs 24 depending from the supporting member 2 and extending into the upper portion of the centrifugal basket and having mounted within them vertical shafts 25. The vertical shafts 25 which are hollow to provide water passages 26 extend through the hubs and project above and below the same, as clearly illustrated in Fig. 1 of the drawings.

Mounted upon the lower end portions of the vertical shafts 25 are curved scrapers 27 tapered outwardly from the shafts and provided at their inner ends with openings 28 to receive the shafts and keyed or otherwise secured to the same. The scrapers which are hollow to provide reservoir chambers 29 are arranged vertically and are curved from the shafts 25 to their outer vertical edges and taper outwardly and they present convex exterior faces 30 at their outer sides and their inner side faces have concave inner portions 31 and plane or flat outer portions 32. The curvature of the scrapers from their shafts to their outer vertical edges permits the scrapers to fold substantially concentrically at the center of the machine within the inner periphery of the imperforate annular portion of the bottom plate of the centrifugal basket so as to be out of the way of the material carried by the basket. This permits the centrifugal basket to be rotated at high speed for purging the material without the scrapers retarding or in anywise interfering with the rotation of the centrifugal basket at high speed during such purging operation, as clearly explained in the said application.

Figure 2:
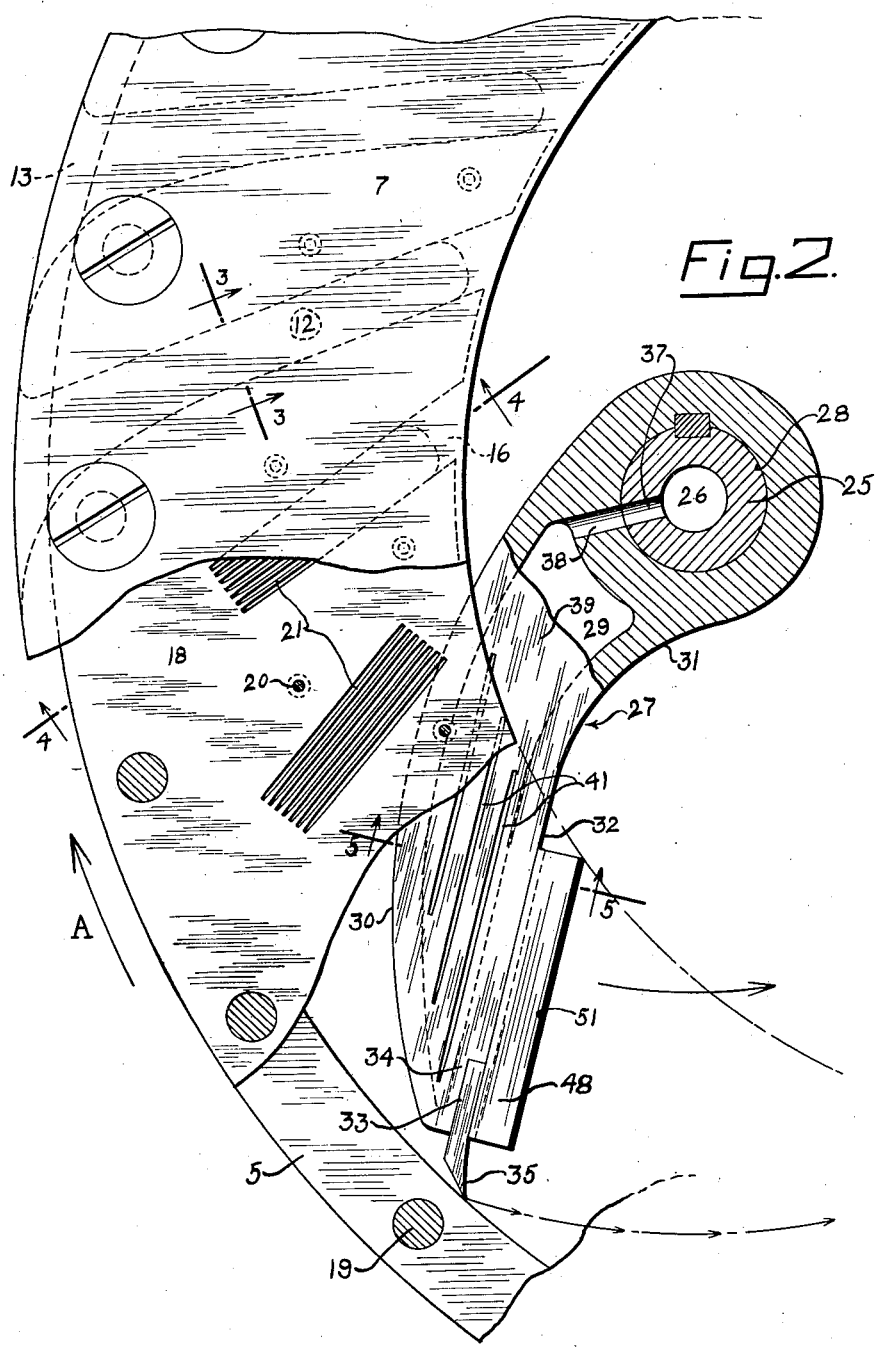
Fig. 2 is an enlarged detail plan view of a portion of the rotary centrifugal basket and one of the scrapers partly broken away and partly in section to illustrate more clearly the arrangement of the slots of the seepage plate and the scraper.
Figure 3:
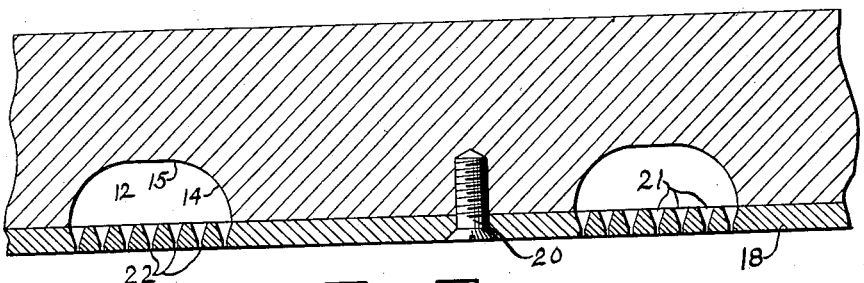
Fig. 3 is an enlarged detail sectional view taken substantially on the line 3—3 of Fig. 2.

The centrifugal basket rotates in the direction of the arrrow A in Fig. 2 of the drawings, separating the liquids and building up a wall of solids against the inner surface of the side walls of the basket and when the scrapers swing outwardly from their closed position they move in the direction of the rotation of the centrifugal basket. The rotation of the centrifugal basket is thereby utilized in assisting the cutting action of the scrapers and the progressive outward movement of the scrapers in cutting and scraping the built-up wall of solids from the side walls of the basket. The scrapers are provided at their outer edges with vertical blades 33 secured in recesses 34 in the inner side faces of the scrapers and projecting outwardly therefrom as clearly illustrated in Fig. 2 of the drawings. Each scraper blade is provided with beveled cutting and shredding teeth 35 which are arranged at intervals to form intervening spaces 36 and in practice the cutting teeth of one scraper will be staggered with relation to the cutting teeth of the other scraper so that the teeth of each scraper will be located opposite the interval between the teeth of the other scraper as fully described and claimed in an application filed by me the 24th day of October 1934 Serial No. 749,828.

The hollow shafts 25 which are closed at their lower ends are provided at a point intermediate of their ends with radial openings 37 forming passages which communicate with passages 38 of the scrapers, as clearly illustrated in Fig. 2 of the drawings. These passages connect the passages 26 of the hollow shaft with the reservoir chambers 29 of the scrapers which have flat upper faces 39. The scrapers are provided in the top walls 39 of the reservoir chambers 29 with slots 41 extending longitudinally of the scrapers and having relatively narrow lower inlet portions 42 and relatively wide upper outlet portions 43 formed by flaring the slots 41 from the inlet portions 42 to their upper ends. The longitudinal slots 41 are arranged in parallelism and in overlapping relation, as clearly shown in Fig. 2 of the drawings, in order to extend the slots a sufficient distance along the reservoirs to operate on practically the entire lower surface of the seepage plate and throughout the entire area of the groups of slots 21 of the said seepage plate.

The hollow scrapers constitute movable reservoirs which are carried into and out of cleaning position by the horizontal swinging movements of the scrapers. The upper ends of the hollow shafts 25 are provided with nipples 44 constituting couplings for connecting branches 45 and 46 of a flexible tube or hose 47 for supplying water under pressure to the hollow scrapers. The nipples 44 are threaded into the upper ends of the hollow shafts but any other suitable means may be employed for connecting the water supply pipe or hose 47 with the hollow shafts. The water pressure may be obtained from a pump or any other suitable means and after the operation of purging and cleaning has been completed the hollow scrapers may be employed as cleaning means for cleansing the slots of the seepage plate and the said scrapers constitute movable reservoirs which are adapted to swing horizontally to and from their cleaning position beneath the seepage plate.

Figure 5:
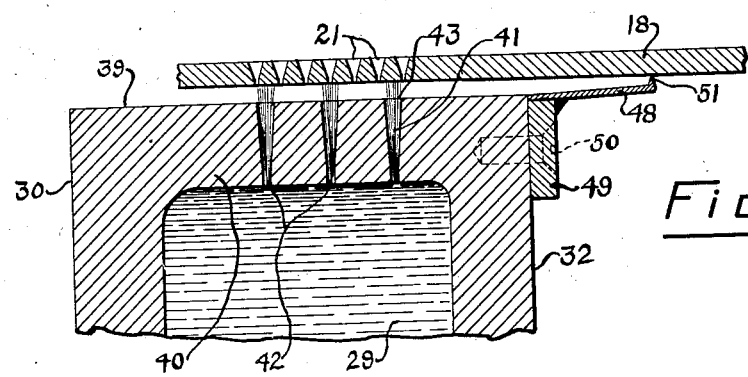
Fig. 5 is an enlarged detail sectional view taken on the line 5—5 of Fig. 2.

Each scraper is provided at the top with a scraper knife 48 consisting of an approximately horizontal blade having an inner vertical attaching portion 49 which is secured by screws 50 or other suitable fastening devices to the flat or plane surfaces of the inner side of the scraper adjacent the flat upper face 39 thereof, as clearly shown in Fig. 5 of the drawings. The scraper knife 48 extends upwardly at a slight inclination and is provided at its outer edge with an upwardly extending cutting portion 51 which is adapted to bear against the lower face of the seepage plate and when the centrifugal basket is rotated the slotted areas of the seepage plate are first carried into contact with the scraper knife which cuts and scrapes any solid particles which may be lodged in and projecting from the slots 21. This cutting and scraping operation occurs prior to the discharge of water through the slots 21. After the operations of purging the material and cleaning the dewatered sludge or wall of solids from the rotary centrifugal basket have been completed and it is desired to clean out the slots of the seepage plate and the channels of the top plate of the basket, the curved scraper 27 is swung outwardly to the position illustrated in Fig. 2 of the drawings, and the centrifugal basket is rotated in the direction of the arrow A in said Fig. 2 and each group of seepage slots 21 will first be carried into engagement with the cutting edge 51 of the scraper knife and any solid material which may have collected at the bottoms of the slots 21 will be cut and shredded and scraped from the lower face of the seepage plate.

The said group of seepage slots will then be carried over the water discharging slots 41 of the hollow scraper and water under pressure will shoot through the seepage or straining slots 21 and will cleanse the same of any solid particles which may have become wedged in the said slots 21. The particles dislodged by the water discharged from the reservoir of the scraper will enter the respective channels 12 with the water and will flow outwardly and be discharged at the periphery of the basket through the outlet 13 of the respective channel. After the seepage plate and the channels have been thoroughly cleaned the flow of water under pressure is cut off and the scrapers are returned to their initial position at the central portion of the rotary centrifugal basket.

Figure 6:
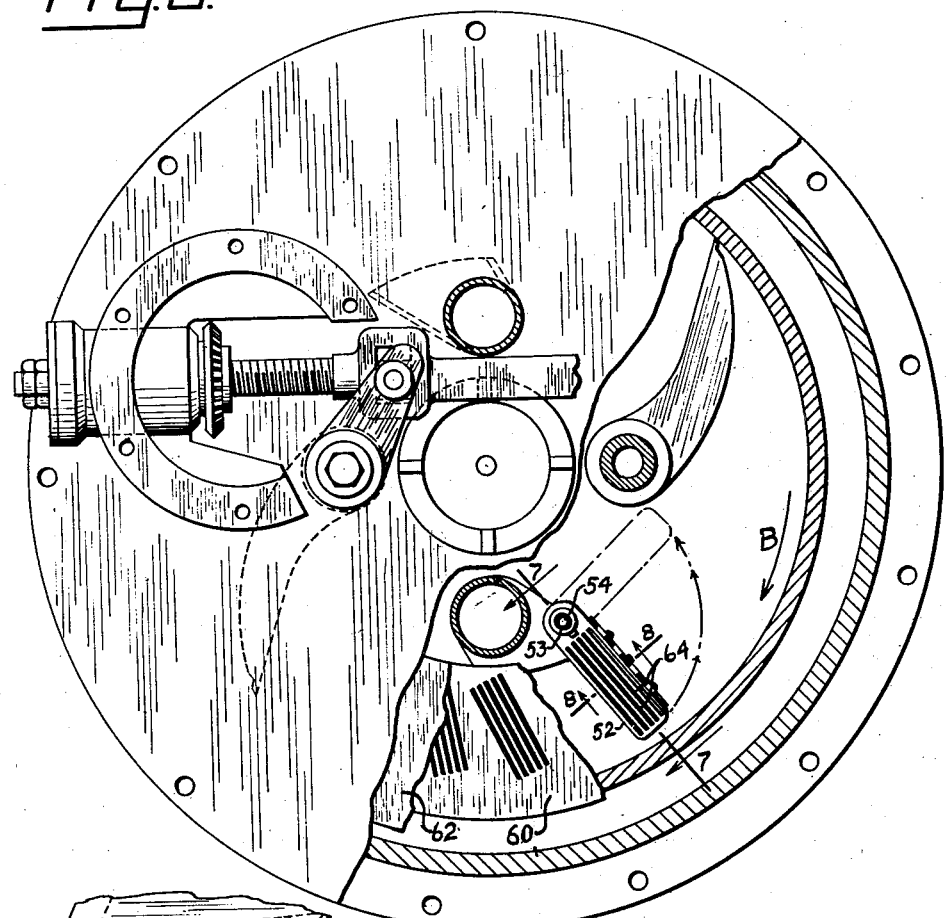
Fig. 6 is a plan view of the centrifugal separating machine partly broken away and partly in section and parts being removed to illustrate more clearly another form of cleaning means.

In Figs. 6 to 8, inclusive, of the drawings is illustrated another form of cleaning device consisting of a substantially oblong casing 52 disposed horizontally and mounted on the lower end of a hollow vertical shaft 53 which is journaled in the intermediate supporting section or member 2 of the casing of the machine. The hollow vertical shaft provides a passage 54 for water under pressure which is delivered to the shaft 53 and the cleaning device by flexible tube or hose 55 connected to the upper end of the hollow vertical shaft by a suitable nipple or coupling 56. While water is a preferable cleansing medium, high pressure air or steam may be substituted for water with equal effectiveness and the term cleansing fluid will be understood to include both liquid fluid and aeriform fluid.

The vertical shaft 53 is provided with upper and lower clamping collars 57 and 58 located at the upper and lower faces of the supporting member 2 of the casing and adapted to secure the shaft 53 and the cleaning device 52 in proper vertical adjustment for cooperating with the slots 59 of the seepage plate 60 and the channels 61 of the top plate 62 of the centrifugal rotary basket 63. The seepage plate 60 and the top plate 62 of the rotary centrifugal basket are constructed the same as heretofore described.

The horizontally swinging cleaning device 52 which preferably consists of a casting is provided with horizontal top and bottom walls and vertical side and end walls, and it is provided in its top wall with water discharging slots 64 flared upwardly to provide reduced lower inlet portions and enlarged upper outlet portions. The slots 64 which may be of any desired number are preferably arranged at intervals throughout the area of the top of the cleaning device and they extend longitudinally of the same, as clearly shown in Fig. 6 of the drawings. The top wall of the cleaning device is provided at its inner end with a flanged opening 65 to receive the lower end of the hollow vertical shaft which communicates with the interior reservoir chamber 66 of the cleaning device 52. The cleaning device may be secured to the lower end of the hollow vertical shaft 53 in any desired manner and the said shaft 53 is provided at a point above the horizontally swinging reservoir with a discharge nozzle 67 disposed horizontally and extending outwardly in substantially a radial direction when the cleaning device is at the limit of its outward movement and is in cleaning position as illustrated in Fig. 6 of the drawings. The nozzle 67 discharges water under pressure into the narrow air inlet openings 68 and not only thoroughly cleans the same but also assists in the discharge of the particles dislodged from the slots 59 of the seepage plate 60. The slots 59 which have narrow bottom inlet portions and which are flared upwardly are of substantially the same construction as the slots 21 heretofore described.

The horizontally swinging cleaning device 52 is provided at its inner side with a vertically disposed scraper knife 70 provided with an upper cutting edge 71 which when the cleaning device is in position for use is maintained yieldably in engagement with the lower face of the seepage plate by a coiled spring 72. The vertically disposed scraper knife 70 which is fitted flat against the outer face of the inner side wall of the hollow cleaning device is provided at spaced points with vertical slots 73 through which pass screws 74 threaded into the adjacent wall of the cleaning device and cooperating with the slots 73 for slidably mounting the scraper knife upon the cleaning device. The scraper knife is provided at its lower edge with a centrally arranged outwardly extending ear 75 to which the lower end of the coiled spring 72 is secured and the upper end of the coiled spring is hooked into a perforation 76 of a lug 77 projecting horizontally from the cleaning device at the top of the same as clearly illustrated in Fig. 8 of the drawings.

The spring maintains the cutting edge of the scraper knife in engagement with the lower face of the seepage plate and by its vertical slidable movement is adapted to effect both a scraping and a chopping or cutting action on any solid material which may become wedged in the slots and as the scraper knife is located at the inner side of the cleaning device and the centrifugal basket rotates in the direction of the arrow B in Fig. 6 the group of slots 59 of the seepage plate will be cleaned of any solid material adhering to the lower face of the seepage plate at the said slots 59 and the water discharged from the reservoir under pressure will thereby be rendered most effective in cleaning from the slots 59 any solid particles which may become wedged within the said slots 59.

The horizontally swinging cleaning device 52 may be operated by any suitable means and in Fig. 7 of the drawings manually operable means is provided in the form of a handle lever 78 provided at its inner end with a clamping collar 77 arranged on the hollow vertical shaft 53 and secured to the same preferably at the upper face of the upper clamping collar 57. The operating handle lever 78 is provided adjacent the collar 77 with an upwardly extending offsetting bend 79 which elevates the body portion of the handle lever 78 above and in spaced relation with the upper intermediate supporting section or member 2 of the casing. While the cleansing device is shown in the drawings as operable manually by a hand lever, it will be understood that the operation of the cleansing device may be accomplished mechanically, electrically, or hydraulically and may be tied in with the operation of the machine as a part of the cycle thereof.

The outer end of the handle lever is adapted to be grasped by an attendant for swinging the cleaning device 52 horizontally to arrange it in its operative cleaning position illustrated in full lines in Fig. 6 of the drawings and also to swing the cleaning device inwardly beyond the inner edge of the seepage plate 60 and the top plate 62 when it is not in use as illustrated in dotted lines in Fig. 6 of the drawings.

In order to limit the upward movement of the scraper knife so that it will not project above the plane of the lower face of the seepage plate and will pass under the seepage plate when the cleaning device is swung outwardly from the dotted line position illustrated in Fig. 6 to the full line position shown in the said figure the scraper knife is provided at its lower edge with depending substantially L-shaped arms 80 located at opposite sides of the ear 75 and extending inwardly to points beneath the bottom wall of the cleaning device and having threaded openings 81 for the reception of screws 82 forming adjustable stops and adapted to engage the cleaning device at the bottom thereof as clearly illustrated in Fig. 8 of the drawings. The screws 82 are provided with lock nuts 83 for securing them in their adjustment and the said screws limit the upward movement of the scraper knife and may be adjusted from time to time as the scraper knife becomes worn so that the cutting edge of the scraper knife will be properly positioned with relation to the lower face of the seepage plate.

The cutting edge 71 of the scraper knife may be divided into a series of spaced cutting teeth 84 arranged at intervals to form intervening spaces 85 for facilitating the cutting and shredding of solid material lodging on the lower face of the seepage plate at the said slots 59.

Also as illustrated in Figs. 12 and 13 of the drawings the cleaning device may be equipped with a scraper knife 86 provided at its upper edge with spaced cutting teeth 87 and having a centrally arranged vertical slot 88 for the reception of a screw 89 or other suitable fastening device for securing the scraper knife 86 slidably and pivotally to the inner side of the cleaning device. The scraper knife 89 is provided at its lower edge at opposite sides of the center with depending L-shaped arms 90 carrying screws 91 forming adjustable stops for engaging the bottom of the cleaning device and provided with lock nuts 92 for securing the said screws 91 in their adjustment. The scraper knife 86 is urged upwardly by a pair of leaf springs 93 preferably located adjacent the arms 90 at the outer sides thereof and secured at their inner ends 94 to the bottom of the cleaning device and having their free outer portions engaging the lower edge of the scraper knife and yieldably supporting the same.

The mounting of the knife 86 permits a pivotal movement of the said knife 86 as well as an upward and downward sliding movement of the same in the operation of the cutting knife in cutting and shredding solid material adhering to the lower face of the seepage plate. The spaced cutting teeth of the cutting knife are effective in cutting and shredding the solid material wedged in the slots of the seepage plate and removing the solid material therefrom for obtaining a maximum effect of the water discharged into the slots by the cleaning device. If desired the cutting edge 51 of the scraper knife 48 may be either a continuous cutting edge or spaced cutting teeth.

Figure 9:
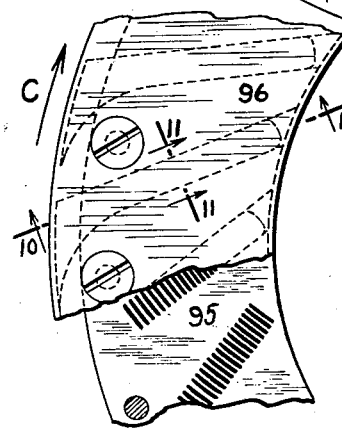
Fig. 9 is a detail view of a portion of the seepage plate illustrating another arrangement of liquid straining slots.
Figure 10:
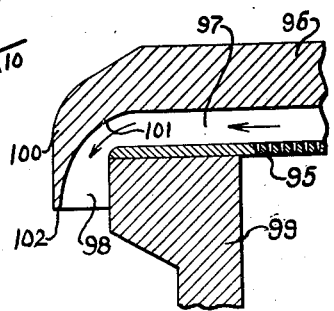
Fig. 10 is a detail sectional view taken substantially on the line 10—10 of Fig. 9.
Figure 11:
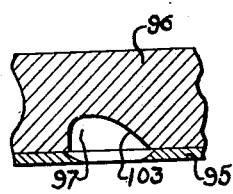
Fig. 11 is a detail sectional view taken substantially on the line 11—11 of Fig. 9.
Figure 14:
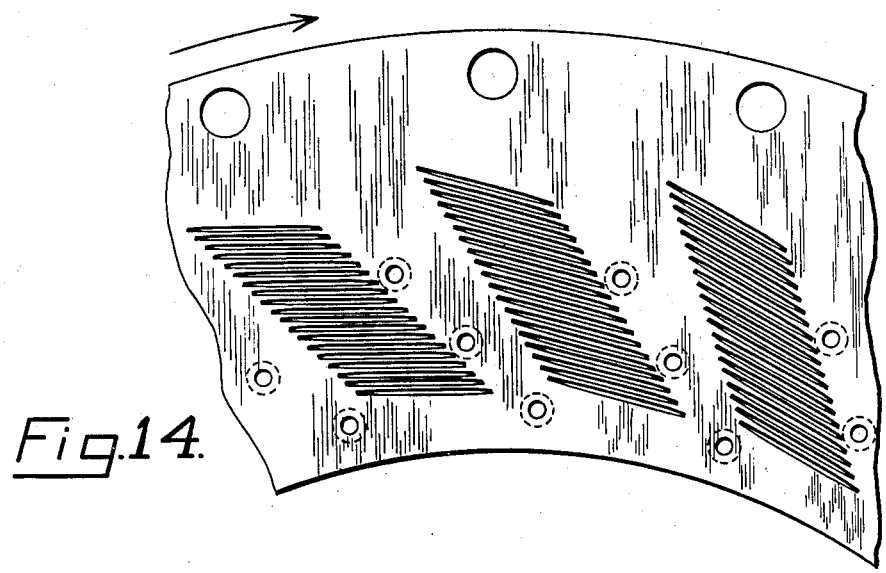
Figs. 14 and 15 are enlarged detail plan views of portions of seepage plates illustrating different arrangements of groups of slots arranged transversely of the seepage channels or at an angle to the longitudinal axis of said channels.
Figure 15:
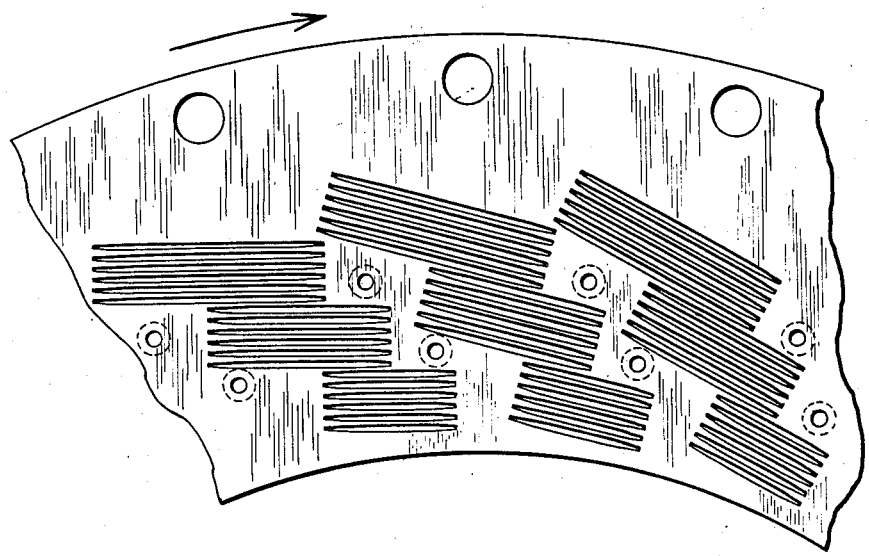

In Figs. 9 to 11, inclusive, is illustrated another form of seepage plate 95 and a top plate 96 of a slightly modified form of the invention. The top plate is provided with an annular series of channels 97 arranged substantially as heretofore shown and described and provided with downwardly extending flaring outlets 98 located at the periphery of the rotary centrifugal basket 99 and having an end wall 100 provided with a downwardly and outwardly inclined deflecting inner face 101 which extends to the lower face of the depending flange 102 of the top plate 96 of the rotary centrifugal basket 99. The channels 97 are provided at one side with a relatively long sloping substantially concave surface 103 which facilitates the discharge of the liquid from the channels.

This relatively long sloping side wall breaks away at the outer portion in a laterally inclined section or portion, the inclination being away from or opposite to the direction of rotation of the centrifugal basket to reduce the friction in the discharge of water. The outer inclined portion of the rear side wall of the channels extends downwardly and rearwardly from the top of the channels while the remaining portion of the rear side wall and the front wall of the channels are substantially vertical.

The centrifugal basket rotates in the direction of the arrow C in Fig. 9 of the drawings and the long sloping side 103 of the channels is located at the rear side of the channel when considered in the direction of the movement of the rotary centrifugal basket and friction within the channels is thereby reduced to a minimum and a free discharge of the liquid is facilitated and less power is consumed in the operation of the machine.

As the operation of the centrifugal separating machine and the purging operation of the basket and the cleaning of the basket of the dewatered sludge are fully explained in the aforesaid application it is deemed unnecessary to further illustrate or describe the same.

What is claimed is:

1. In a centrifugal separating machine, a rotary centrifugal basket having a top provided with open-ended liquid discharge channels and having at the bottom thereof groups of seepage openings provided with lower inlet portions communicating with the rotary basket and upper outlet portions communicating with the channels, the outlet portions being of greater size than the inlet portions and the open-ended channels permitting passage of air entirely through the channels over and past said seepage openings during rotation of the basket.

2. In a centrifugal separating machine, a rotary centrifugal basket having a top provided with open-ended liquid discharge channels having at the bottom thereof groups of substantially parallel slots, the slots of each group being relatively long and extending longitudinally of the respective channel throughout the major portion of the length thereof to establish communication between the interior of the basket and the channels.

3. In a centrifugal separating machine, a rotary centrifugal basket having a top provided with a central opening and having open-ended liquid discharge channels extending from the said opening to the periphery of the basket, said channels having groups of substantially parallel slots which establish communication between the interior of the basket and said channels and which are arranged at intervals and cover the major portion of the area of the bottom of the channels, said channels providing for the continuous passage of air longitudinally therethrough during rotation of the basket to accelerate the centrifugal forces in the separation of the liquids and solids and the discharge of the liquids through the channels.

4. In a centrifugal separating machine, a rotary centrifugal basket having a top provided with a central opening and having spaced open-ended discharge channels extending from the said opening to the periphery of the basket and having at the bottom of the channels groups of spaced slots establishing a communication between the interior of the basket and said channels and covering the major portion of the area of the bottom of the channels and having upwardly diverging side walls forming lower reduced inlet portions and upper outlet portions of greater size than the inlet portions, said channels providing for the continuous passage of air longitudinally therethrough during rotation of the basket to assist the centrifugal forces in the separation of liquids and solids and the discharge of liquids through the channels.

5. In a centrifugal separating machine, a rotary centrifugal basket having a top provided with open-ended liquid discharge channels, and a seepage plate constituting the bottom wall of the channels and provided with spaced slots extending longitudinally of the channels which establish communication between the interior of the basket and said channels, said slots each having lower inlet portions and upper outlet portions, the upper outlet portions being of greater size than the inlet portions and the seepage plate being provided at the ends of the slots with concave surfaces extending from the inlet portions of the slots to the upper face of the seepage plate.

6. In a centrifugal separating machine, a rotary centrifugal basket having a top provided with open-ended liquid discharge channels, each having a transversely-arched top wall and transversely-concave side walls, the top wall of each channel being provided at the inner end thereof with a downwardly-extending concave portion terminating above the lower edges of the sides of the channel and providing an opening at the inner end of the respective channel and a seepage plate constituting the bottom wall of the channels and having seepage openings, establishing communication between the interior of the basket and the discharge channels the said top of the basket, when the latter is rotated at high speed, functioning as a fan or blower and causing currents of air to travel through the open-ended channels and pass over the seepage openings at a high velociy to produce a vacuum or suction effect at the seepage openings for assisting the centrifugal forces in the separating of liquid from the solids and the discharge of the liquid through the seepage openings and through the channels.

7. In a centrifugal separating machine, a rotary centrifugal basket mounted to rotate on a vertical axis and having imperforate side walls and provided with seepage openings in the top thereof leading from the interior of the basket and cleaning means operating within the basket and including a reservoir for a cleaning fluid under pressure, said reservoir having outlets arranged in its top for discharging the cleaning fluid through the seepage openings of the basket, means for mounting the reservoir for horizontal movement toward and from the seepage openings and means for supplying a cleaning fluid under pressure to the reservoir.

8. In a centrifugal separating machine, a rotary centrifugal basket mounted to rotate on a vertical axis and having imperforate side walls and provided at the top with seepage openings leading from the interior of the basket and cleaning means operating within the basket and including a reservoir for a cleaning fluid under pressure, said reservoir being provided with outlets arranged at the top thereof to discharge upwardly for shooting the cleaning fluid into the seepage openings in the top of the basket, means for mounting the reservoir for movement toward and from the seepage openings, and means for supplying cleaning fluid under pressure to the reservoir.

9. In a centrifugal separating machine, a rotary centrifugal basket provided at the top with seepage openings leading from the interior of the basket and having cleaning means operating within the basket and including a reservoir for a cleaning fluid, said reservoir being provided with outlets arranged to discharge upwardly for shooting the cleaning fluid through the seepage openings to clean the latter, means for mounting the reservoir for movement toward and from the seepage openings, means for scraping solid material from the seepage openings prior to shooting the cleaning fluid through the same, and means for supplying cleaning fluid to the reservoir under pressure.

10. In a centrifugal separating machine, a rotary centrifugal basket mounted to rotate on a vertical axis and provided in its top with seepage openings and having liquid discharge channels extending over the seepage openings, the latter establishing communication between the interior of the basket and the channels and cleaning means including a reservoir for a cleaning fluid located within the basket and provided in its top with fluid discharging openings, means for moving the reservoir horizontally to and from a position for shooting the cleaning fluid upwardly through the reservoir openings and the seepage openings, means carried by the reservoir and arranged to scrape and cut solid material from the seepage openings prior to shooting the cleaning fluid through the same and means for supplying the reservoir with a cleaning fluid under pressure.

11. In a centrifugal separating machine, a rotary centrifugal basket mounted to rotate on a vertical axis and provided in its top with seepage openings and having liquid discharge channels extending over the seepage openings, the latter establishing communication between the interior of the basket and the channels, and cleaning means including a reservoir for a cleaning fluid and operating within the centrifugal basket and provided with outlets arranged to discharge upwardly for shooting the cleaning fluid through the seepage openings and into the channels, means for moving the reservoir to and from a position beneath the seepage openings, a scraper knife extending along the reservoir and carried by the same and provided with spaced cutting teeth arranged to cut and shred solid material lodged in the seepage openings prior to shooting the cleaning fluid through the same and means for supplying a cleaning fluid under pressure to the reservoir.

12. In a centrifugal separating machine, a rotary centrifugal basket provided in its top with seepage openings and having liquid discharge channels extending over the seepage openings, the latter establishing communication between the interior of the basket and the channels, means for shooting a cleaning fluid under pressure through the seepage openings, and means for scraping solid material from the seepage openings prior to shooting the cleaning fluid through the same.

13. In a centrifugal separating machine, a rotary centrifugal basket mounted for rotation on a vertical axis and provided in its top with seepage openings and having liquid discharge channels extending over the seepage openings, the latter establishing communication between the interior of the basket and the channels, means for rotating the basket to separate liquids from solids and to deposit the solids against the side walls of the basket, a horizontally swinging scraper arranged within the basket and provided with means for cutting said deposited solids from the walls of the basket, the bottom of the basket having an opening therein for the discharge of the solids after cutting of the same, said scraper having an interior chamber forming a reservoir for a cleaning fluid and having outlets arranged to discharge upwardly for shooting the fluid through the seepage openings, and means for supplying the reservoir with the cleaning fluid under pressure for discharge under pressure therefrom.

14. In a centrifugal separating machine, a rotary centrifugal basket provided in its top with seepage openings and having liquid discharge channels extending over the seepage openings, the latter establishing communication between the interior of the basket and said channels, a horizontally swinging scraper arranged within the basket and provided with means for cutting sludge from the walls of the basket, said scraper having an interior chamber forming a reservoir for a cleaning fluid and having outlets arranged to discharge upwardly for shooting the fluid through the seepage openings, a scraper knife carried by the scraper and extending upwardly therefrom and arranged to cut solid material from the seepage openings.

15. In a centrifugal separating machine, a rotary centrifugal basket provided in its top with seepage openings and having liquid discharge channels extending over the same and communicating with the interior of the basket through said openings, cleaning means including a hollow vertical shaft forming a passage for a cleaning fluid, a horizontally swinging reservoir carried by the said shaft and having an interior chamber communicating with the shaft to receive the cleaning fluid, said reservoir being provided at the top with openings adapted to discharge the cleaning fluid under pressure from said chamber upwardly through the seepage openings, and means connected with the hollow shaft for supplying the reservoir with the cleaning fluid under pressure.

16. In a centrifugal separating machine, a rotary centrifugal basket mounted to rotate on a vertical axis and having imperforate side walls and provided in its top with seepage openings and having liquid discharge channels extending over the same and communicating with the interior of the basket through said openings and cleaning means including a hollow vertical shaft forming a passage for a cleaning fluid, a horizontally swinging reservoir carried by the shaft and having an interior chamber communicating with the passage of the shaft to receive the cleaning fluid, said reservoir being provided with outlets arranged to discharge upwardly for shooting the cleaning fluid under pressure through the seepage openings, a scraper knife mounted on and carried by the reservoir, yieldable means for projecting the knife upwardly above the reservoir for causing the knife to scrape solid material from the seepage openings, means for limiting the upward movement of the knife, and means connected with the hollow shaft for supplying fluid through the hollow shaft under pressure to the reservoir.

17. In a centrifugal separating machine, a rotary centrifugal basket provided in its top with seepage openings and having liquid discharge channels extending over the same and communicating with the interior of the basket through said openings, cleaning means including a hollow vertical shaft forming a passage for a cleaning fluid, a horizontally swinging reservoir carried by the shaft and having an interior chamber communicating with the passage of the shaft to receive the cleaning fluid, said reservoir being provided with outlets arranged to discharge upwardly for shooting the cleaning fluid under pressure through the seepage openings, a scraper knife slidably and pivotally mounted on the reservoir for upward and downward movement, yieldable means for urging the knife upwardly for holding the knife in position for removing solid material lodged in the seepage openings and means connected with the hollow shaft for supplying the fluid under pressure to the reservoir.

18. In a centrifugal separating machine, a rotary centrifugal basket provided in its top with seepage openings and having liquid discharge channels extending from the same, said openings establishing communication between the interior of the basket and the channels, cleaning means including a hollow vertical shaft forming a passage for a cleaning fluid under pressure, a horizontally swinging reservoir carried by the shaft and having an interior chamber communicating with the passage of the shaft to receive the fluid said reservoir being provided with outlets arranged to discharge upwardly for shooting the cleaning fluid under pressure through the seepage openings, a scraper knife slidably and pivotally mounted on the reservoir for upward and downward movement, yieldable means for urging the knife upwardly for holding the knife in position for removing solid material lodged in the seepage openings, spaced adjusting means carried by the scraper knife and arranged to engage the reservoir for limiting the upward movement of the knife, and means connected with the hollow shaft for supplying the fluid under pressure to the reservoir.

19. In a centrifugal separating machine, a rotary centrifugal basket provided in its top with seepage openings and having liquid discharge channels extending from the same and communicating with the interior of the basket through said seepage openings, cleaning means including a hollow vertical shaft forming a passage for a cleaning fluid under pressure, a horizontal swinging reservoir carried by the shaft and having a chamber communicating with the passage of the shaft to receive fluid from the hollow shaft, said reservoir being provided in its top with openings for discharging the cleaning fluid under pressure upwardly to shoot the same through the seepage openings, a scraper knife carried by the reservoir and projecting above the same arranged to remove solid material from the seepage openings, means connected with the hollow shaft for supplying the cleaning fluid under pressure to the reservoir, and operating means also connected with the hollow shaft for swinging the reservoir inwardly and outwardly to and from a position beneath the seepage openings.

20. In a centrifugal separating machine, a rotary centrifugal basket provided with an annular top having liquid discharge channels provided with air inlets at the inner periphery of the said top and outlets at the outer periphery of the top, a seepage plate constituting the bottom wall of the channels and provided with seepage openings communicating with the channels and the interior of the basket, a hollow vertical shaft forming a passage for a cleaning fluid under pressure and provided with a discharge nozzle arranged to shoot the cleaning fluid through the air inlets of the said channels, and a horizontally swinging reservoir carried by the said shaft and having an interior chamber communicating with the passage of the shaft, said reservoir being also provided with outlets arranged to discharge upwardly for shooting the cleaning fluid through the openings of the seepage plate.

21. In a centrifugal separating machine, a rotary centrifugal basket having imperforate side walls and a top provided with open-ended fluid discharge channels having communication with the interior of the basket and also having outlets at the periphery of the top of the basket and extending inwardly therefrom, said outlets being inwardly tapered and said channels being arched transversely and provided with a relatively long sloping side wall at the side opposite the direction of rotation of the basket whereby friction of the liquid within the channels and consumption of power for operating the machine are materially reduced.

22. In a centrifugal separating machine, a rotary centrifugal basket provided at the top with liquid discharge channels and having seepage openings in the bottom walls thereof and which establish communication between the interior of the basket and said channels through the top of the basket, a horizontally swinging scraper provided with an inner side face composed of a concave inner portion and an outer portion presenting a plane surface, and a scraper knife secured to the scraper at the outer portion of its inner face adjacent the top thereof and extending from the scraper in substantially the plane of the top of the same and provided with an upwardly extending cutting edge adapted to remove solid material from the seepage openings at the top of the basket.

23. In a centrifugal separating machine, a rotary centrifugal basket provided in its top with seepage passages leading from the interior of the basket, cutting and scraping means for removing solid material wedged in the seepage passages, and means for shooting a cleaning fluid under pressure into the seepage passages.

24. In a centrifugal separating machine, a rotary centrifugal basket having a top provided with liquid discharge channels and having seepage slots in the bottom walls of the channels to establish communication between the interior of the basket and the channels and disposed at an angle to the longitudinal axis of the channels.

25. In a centrifugal separating machine, a rotary centrifugal basket having a top provided with liquid discharge channels and having in the bottom wall thereof transversely disposed seepage slots to establish communication between the interior of the basket and the channels and arranged at an angle to the longitudinal axis of the channels and extending outwardly and rearwardly with respect to the direction of rotation of the basket.

26. In a centrifugal separating machine, a rotary centrifugal basket mounted for rotation on a vertical axis and having imperforate side walls and also having a top plate provided in its lower face with channels extending inwardly from the periphery of the basket and forming liquid discharge channels, and a seepage plate located at the lower face of the top plate and constituting the bottom wall of the channels and provided with a plurality of groups of seepage slots disposed transversely of the channels and extending outwardly and rearwardly with respect to the direction of the rotation of the basket.

27. In a centrifugal separating machine, a rotary centrifugal basket having a top plate provided with liquid discharge channels having outlets at the periphery of the top of the basket and extending inwardly therefrom and communicating with the interior of the basket and having the outer portion of one side wall sloped rearwardly with respect to the direction of the rotation of the basket in a lateral inclination to reduce friction in the discharge of liquid.

28. In a centrifugal separating machine, a rotary centrifugal basket having a top provided with liquid discharge channels having communication with the interior of the basket and also having outlets at the periphery of the top of the basket and tapered inwardly therefrom and having the outer portion of one side wall sloped rearwardly with respect to the direction of rotation of the basket in a lateral inclination to reduce friction in the discharge of liquid, the remaining portion of the said side wall and the other side wall being approximately vertical.

29. In a centrifugal separating machine, a rotary centrifugal basket having a top plate provided with liquid discharge channels communicating with the interior of the basket and having downwardly flared outlets at the periphery of the basket and tapered inwardly therefrom and having the outer portion of the rear side wall sloped in a laterally inclined surface extending downwardly and rearwardly from the top of the channels to reduce the friction in the discharge of the liquid, said laterally inclined surface being arranged at an obtuse angle to the remaining portion of the said side wall of the respective channels to increase the flare at the outer portion of the channels.

30. In a centrifugal separating machine, a rotary centrifugal basket including a cylindrical body portion, a top plate provided with an annular series of fastening devices arranged at spaced points for securing the top plate to said cylindrical body portion, said top plate being provided at the spaces between the fastening devices with liquid discharge channels having outlets located beyond the walls of the body portion of the basket, and a seepage plate secured between the top plate and the cylindrical body portion of the basket by the fastening devices of the top plate and terminating short of the said outlets of the channels and having seepage openings communicating with the channels and with the interior of the basket.

31. In a centrifugal separating machine, a rotary centrifugal basket mounted for rotation on a vertical axis and having imperforate side walls and a top provided with liquid discharge channels open at opposite ends and having seepage openings at the bottoms thereof to establish communication between the interior of the basket and the channels to permit liquid to pass from the basket into the channels, means for rotating the basket to separate the liquids from the solids and direct the liquids upwardly through the seepage openings and cause currents of air to travel through the channels from the inner end of the channels and pass over the seepage openings at a high velocity and through the outer ends of the channels and thereby cause a vacuum effect at the seepage openings to assist the centrifugal forces in the separation of liquid from the solids and the discharge of the liquid through the channels, a movably mounted fluid receiving reservoir mounted in the basket and having outlets for the discharge of fluid from the reservoir into the seepage openings and channels to free the latter of foreign matter, means connected with the reservoir for the supply of fluid under pressure thereto for discharge through said outlets of the reservoir into said seepage openings and channels, and means for moving said reservoir into and out of cooperative relation with said seepage openings.

32. In a centrifugal separating machine, a rotary centrifugal basket having imperforate side walls and a top provided with liquid discharge channels open at opposite ends and having seepage openings at the bottoms thereof to establish communication between the interior of the basket and the channels to permit liquid to pass from the basket into the said channels, means for rotating the basket to separate the liquids from the solids and cause currents of air incident to centrifugal action to travel through the channels from the inner end of the channels and pass over the seepage openings at a high velocity to and through the outer ends of the channels and produce a vacuum effect at the seepage openings to assist the centrifugal forces in the separation of liquid from the solids and the discharge of the liquids through the channels, the openings at the inner ends of the channels being smaller than the openings at the outer ends of the channels, a movably mounted fluid receiving reservoir mounted in the basket and having outlets for the discharge of fluid from the reservoir, means connected with the reservoir for the supply of fluid under pressure thereto for discharge through said outlets of the reservoir into said seepage openings to free the latter of foreign matter, and means associated with the reservoir for cleaning the bottoms of said channels at the inner ends of the seepage openings prior to introduction of fluid under pressure from said reservoir, and means whereby to move said reservoir into and out of cooperative relation with said seepage openings.

33. In a centrifugal separating machine, a rotary centrifugal basket having imperforate side walls and a top provided with liquid discharge channels open at opposite ends having seepage openings intermediate their ends to establish communication between the interior of the basket and the channels to permit liquid to pass from the basket into the said channels, and means for rotating the basket to separate the liquids from the solids and cause currents of air incident to centrifugal action to travel through the channels from the inner ends of the channels and pass over the seepage openings at a high velocity and produce a vacuum at the seepage openings to assist the centrifugal forces in the separation of liquid from the solids and the discharge of the liquid through the channels, and means in the basket operable to remove foreign matter from adjacent the lower ends of the seepage openings.

34. In a centrifugal separating machine, a rotary centrifugal basket, means for rotating the basket, a combined seepage means and vacuum producing means having communication with the interior of the basket and carried by and rotatable with the basket, the vacuum producing means having an air inlet separate from the seepage means, and having an outlet exteriorly of said basket chamber, said vacuum producing means causing currents of air to pass through said separate inlet over the seepage means and create a suction thereat and thereby accelerate the flow of liquid through the combined seepage means and vacuum producing means as the basket rotates.

35. In a centrifugal separating machine, a rotary centrifugal basket having a chamber and provided with combined seepage means and vacuum producing means, means for rotating the basket, the seepage means communicating with the chamber of the basket and the vacuum producing means including an open-ended air channel the open ends of which form an inlet and an outlet arranged exteriorly of the basket chamber and communicating with the chamber of the basket through the aforesaid communication between the seepage means and the chamber of the basket and incident to rotation of the basket cause currents of air to pass through said channel from the inlet end of the latter over the seepage means and create a suction thereat and thereby accelerate the flow of liquid through the outlet end of the channel of the combined seepage means and vacuum producing means as the basket rotates.

36. In a centrifugal separating machine, a rotary centrifugal basket mounted to rotate on a vertical axis and having imperforate side walls, means for rotating the basket to separate liquids from solids and build up a wall of solids against the side walls of the basket, a combined seepage means and vacuum producing means at the top of the basket, the seepage means having communication with the vacuum producing means and the interior of the basket and the combined seepage means and vacuum producing means being rotatable with the basket, the basket having an opening in the bottom thereof for the discharge of solids from the basket, means for removing the solids from the basket through said opening in the bottom of the basket, and means operable to free the combined seepage means and vacuum means of solid matter.

37. In a centrifugal separating machine, a rotary centrifugal basket mounted to rotate on a vertical axis and having imperforate side walls, means for rotating the basket to separate liquids from solids and build up a wall of solids against the side walls of the basket, a combined seepage means and vacuum producing means mounted on the basket at the top thereof and rotatable therewith and the seepage means communicating with the interior of the basket and with the vacuum producing means, the basket having an opening in the bottom thereof for the discharge of solids from the basket, means for gradually removing the wall of solids for discharge through the opening in the bottom of the basket, and fluid pressure means operable to remove solid matter from the combined seepage and vacuum producing means in the event of clogging of same incident to solid material.

38. In a centrifugal separating machine, a rotary centrifugal basket having imperforate side walls and mounted to rotate on a vertical axis to separate liquids from solids, means for rotating the basket, a combined seepage means and vacuum producing means having communication with each other, the seepage means having communication with the interior of the basket and the vacuum producing means, the said combined means being rotatable with the basket and including radially open-ended channels, and means for directing a flow of fluid under pressure through said channels from the inner ends to and through the outer ends of the same to clean the open-ended channels.

39. In a centrifugal separating machine, a rotary centrifugal basket mounted for rotation on a vertical axis to separate liquids from solids and having imperforate side walls, means for rotating the basket, a combined seepage means and vacuum producing means having communication with each other and also having communication with the interior of the basket and carried by the latter and rotatable therewith to assist the centrifugal forces in the discharge of the separated liquids from the basket, and means for cleaning the combined seepage means and vacuum producing means.

40. In a centrifugal separating machine, a rotary centrifugal basket mounted for rotation on a vertical axis and having imperforate side walls, means for rotating the basket, a combined seepage means and vacuum producing means having communication with each other and with the interior of the basket and carried by the basket and rotatable therewith and including open-ended air passages for the flow of air over and past the communication between the seepage means and the basket to assist the centrifugal forces to accelerate discharge of the separated liquids from the basket, and means operating from within the basket to clean the combined seepage means and vacuum producing means including the supply of fluid under pressure through the open-ended air passages.

41. In a centrifugal separating machine, a rotary centrifugal basket, means for rotating the basket to separate liquids from solids, seepage means leading from the interior of the basket, a plurality of radially-disposed, spaced, interiorly-tapered, open-ended channels associated with the seepage means and communicating therewith to provide passages for the discharge of separated liquids from the basket incident to centrifugal forces, the said channels also providing air passages for the rapid passage of air currents therethrough incident to the centrifugal forces due to rapid rotation of the basket to create a suction at the seepage means to assist the centrifugal forces to effect rapid discharge of the separated liquids from the basket.

42. In a centrifugal separating machine, a rotary centrifugal basket mounted to rotate on a vertical axis, means for rotating the basket at a high rate of speed to separate liquids from solids, a plurality of horizontal, spaced, radially-disposed, open-ended channels at the top of the basket to rotate therewith and which communicate intermediate their ends with the interior of the basket to permit of discharge of the separated liquids from the interior of the basket and which suck air exteriorly of the basket across the communications between the channels and the interior of the basket to accelerate the discharge of the separated liquids from the basket as the latter rotates, and means operable subsequent to the separation of the liquids from the solids and during rotation of the basket to supply fluid under pressure to the inner ends of the channels and to the channels through said intermediate communications with the basket whereby to remove solids from the channels and said communications.

43. In a centrifugal separating machine, a rotary centrifugal basket having imperforate side walls and mounted to rotate on a vertical axis, means for rotating the basket at a high rate of speed to separate liquids from solids and to build up a wall of solids against the imperforate side walls of the basket, a plurality of horizontal, spaced, radially-disposed, interiorly-tapered, open-ended channels at the top of the basket to rotate therewith and which communicate intermediate their ends with the interior of the basket to permit of discharge of the separated liquids from the interior of the basket and which suck air exteriorly of the basket across the communications between the channels and the interior of the basket to accelerate the discharge of the separated liquids from the basket at the top thereof as the basket rotates, the basket having an opening in the bottom thereof, means for gradually removing the built-up wall of solids from the basket, means operable subsequent to the separation of the liquids from the solids and removal of the latter from the basket and during rotation of the basket to supply fluid under pressure to the inner ends of the channels and to the channels through said intermediate communications with the basket to remove solids from the channels and said communications, and means associated with the fluid pressure means operable prior to the operation of the latter means to remove solids adhering to the underside of the basket top adjacent said communications.

44. In a centrifugal separating machine, a rotary centrifugal basket mounted for rotation on a vertical axis to separate liquids from solids and discharge the liquids from the top of the basket and collect the solids in the basket, the basket having imperforate side walls, means for rotating the basket, a plate secured to the top of the basket and having sets of staggered groups of seepage slots therein leading from the interior of the basket, and a member disposed on said plate and secured thereto and having open-ended channels therein disposed, one channel over each set of staggered groups of slots and communicating with the interior of the basket through the respective groups of seepage slots and at their ends communicating with the outside atmosphere to cause passage of air currents through the channels as the basket rotates to accelerate discharge of the liquids at the top of the basket through the seepage slots and channels as the basket rotates.

45. In a centrifugal separating machine, a rotary centrifugal basket mounted for rotation on a vertical axis to separate liquids from solids and discharge the liquids from the top of the basket and collect the solids in the basket, the basket having imperforate side walls and a discharge opening in the bottom thereof, means for rotating the basket, an annular plate secured to the top of the basket and having spaced groups of seepage slots leading from the interior of the basket, and a member secured on said plate and having open-ended channels therein disposed, one channel over each group of seepage slots and communicating with the interior of the basket through the respective groups of seepage slots and at their open ends communicating with the outside atmosphere to cause passage of air currents through the channels as the basket rotates to accelerate discharge of liquids at the top of the basket through the seepage slots and channels as the basket rotates, means operable within the basket to gradually remove the collected solids from the basket for discharge through the discharge opening in the bottom of the basket, means for scraping the underside of said plate to remove solid material from the plate and the seepage slots, and means for directing fluid under pressure into the seepage slots and channels for removing solids therefrom.

46. In a centrifugal separating machine, a rotary centrifugal basket having a chamber, means for rotating the basket; a combined seepage means and vacuum producing means, the seepage means having communication with the chamber of the basket and with the vacuum producing means, and the latter having an inlet and an outlet exteriorly of said basket chamber to suck atmospheric air across the communication between the interior of the basket chamber and the vacuum producing means to create a suction at the communication between the interior of the basket chamber and the vacuum means to accelerate the flow of liquids from the chamber of the basket through the combined seepage means and vacuum producing means as the basket rotates.

47. In a centrifugal separating machine, a rotary centrifugal basket provided at its top with seepage openings leading from the interior of the basket, means for scraping solid material from the seepage openings, and means for supplying a cleaning fluid under pressure to the seepage openings for passage therethrough to clean the same.

48. In a centrifugal separating machine, a rotary centrifugal basket provided with seepage openings communicating with the interior of the basket, and means for supplying a fluid medium to the seepage openings to clean the same, including a reservoir within the basket to receive fluid under pressure and provided with an outlet for the discharge of fluid under pressure upwardly for passage through the seepage openings.

49. In a centrifugal separating machine, a rotary centrifugal basket having imperforate side walls and provided with sets of seepage openings communicating with the interior of the basket, an open ended channel arranged over each set of seepage openings and which channels have communication with the interior of the basket through the seepage openings, means including a pipe having an outlet to supply a fluid medium under pressure at one end of the channels for passage through the latter to clean the same and including means to deliver fluid under pressure to the seepage openings for passage through the latter and the channels to clean the seepage openings.

50. In a centrifugal separating machine, a rotary centrifugal basket having imperforate side walls and a top provided with liquid discharge channels open at opposite ends and having seepage openings at the bottoms thereof to establish communication between the interior of the basket and said channels, means for rotating the basket to separate liquids from solids to discharge the liquids from the basket incident to centrifugal force through the seepage openings and channels, and means for conveying a fluid medium under pressure to the interior of the basket including a pipe extending into the basket and at its inner end provided with means for directing the fluid medium under pressure to and through the seepage openings for cleaning the same, said pipe having a nozzle intermediate its ends disposed in the horizontal plane of movement of the inner ends of said channels as the basket rotates to direct fluid medium under pressure to and through the channels to clean the latter.

51. In a centrifugal separating machine, a rotary centrifugal basket having a top provided with vacuum producing means including tapering liquid discharge channels open at opposite ends to provide an inlet and an outlet and having seepage openings in the bottoms to establish communication between the interior of the basket and the channels to permit liquid to pass from the basket into said channels, means for rotating the basket to separate liquids from solids and incident to centrifugal action cause air to travel through the channels from the inlet ends of the same and pass over the seepage openings at a high velocity and create a suction effect at the seepage openings to accelerate discharge of the separated liquids from the basket through the seepage openings and the tapering channels.

52. In a centrifugal separating machine, a rotary centrifugal basket having a top provided with vacuum producing means including tapering liquid discharge channels open at opposite ends to provide an inlet and an outlet and having seepage slots in the bottoms to establish communication between the interior of the basket and the channels to permit liquid to pass from the basket into said channels, means for rotating the basket to separate liquids from solids and incident to centrifugal action cause air to travel through the channels from the inlet ends of the same and pass over the seepage slots at a high velocity and create a suction effect at the seepage slots to accelerate discharge of the separated liquids from the basket through the seepage slots and the tapering channels, said seepage slots being arranged at an angle to the longitudinal axis of the tapering channels.

53. A rotary centrifugal basket for centrifugal machines having an imperforate side wall and a seepage means for passage of liquids from the basket, and a knife-like element movable over the seepage means to remove solids accumulations at the seepage means.

54. A rotary centrifugal basket for centrifugal machines having an imperforate side wall and a seepage means for passage of liquids from the basket, and means movable across the seepage means at the under side thereof to remove solid material away from the underside of the seepage means.

55. In a centrifugal separating machine, a rotary centrifugal basket having a chamber and provided with a combined seepage means and vacuum producing means, the seepage means communicating with the chamber of the basket and the vacuum producing means, the latter including tapering channels open at their inner ends and open at their outer ends and having their inner ends disposed nearer the center of the basket than the outer ends and each channel having a relatively long tapering interior including a relatively long sloping side wall at the side opposite the direction of rotation of the basket whereby to reduce friction and discharge liquid through the channels and the flow of separated liquids from the basket accelerated incident to vacuum action.

56. In a centrifugal separating machine a rotary centrifugal basket mounted to rotate on a vertical axis and having imperforate side walls and provided in its top with seepage openings and having liquid discharge channels extending over the seepage openings, the latter establishing communication between the interior of the basket and the channels, cleaning means including a reservoir for a cleaning fluid operating within the centrifugal basket and provided with outlets arranged to discharge upwardly for shooting the cleaning liquid through the seepage openings and into and through the channels, means for moving the reservoir to and from a position beneath the seepage openings, a scraper knife extending along the reservoir and carried with the same and arranged to scrape and cut solid material from the seepage openings prior to shooting the cleaning fluid through the same, and means for supplying the reservoir with a cleaning fluid under pressure.

57. A scraper for cleaning solids from the annular wall of a rotary centrifugal basket including a body provided with a hub portion having cutting means, and having an interior fluid medium receiving chamber provided with a fluid medium inlet and having an outlet leading from the chamber through the scraper at the top thereof.

58. In a centrifugal separating machine, a rotary centrifugal basket having imperforate side walls and a top provided with vacuum producing means including liquid discharge channels open at opposite ends and having seepage openings at the bottoms thereof to establish communication between the interior of the basket and the channels to permit liquid to pass from the basket into the said channels, and means for rotating the basket to separate the liquids from the solids and cause currents of air incident to centrifugal action to travel through the channels from the inner end of the channels and pass over the seepage openings at a high velocity and create a vacuum or suction effect at the seepage openings to assist the centrifugal forces in the separation of liquid from the solids and the discharge of the liquid through the channels.

JOSEPH S. PECKER.